(12) United States Patent
Stewart

(10) Patent No.: US 11,172,758 B1
(45) Date of Patent: Nov. 16, 2021

(54) MODULAR PORTABLE BAR

(71) Applicant: Albert Stewart, Richburg, SC (US)

(72) Inventor: Albert Stewart, Richburg, SC (US)

( * ) Notice: Subject to any disclaimer, the term of this patent is extended or adjusted under 35 U.S.C. 154(b) by 0 days.

(21) Appl. No.: 17/027,787

(22) Filed: Sep. 22, 2020

(51) Int. Cl.
*A47B 21/06* (2006.01)
*A47B 3/00* (2006.01)
*A47B 3/06* (2006.01)
*H02M 5/42* (2006.01)
*H02J 7/00* (2006.01)

(52) U.S. Cl.
CPC .............. *A47B 21/06* (2013.01); *A47B 3/002* (2013.01); *A47B 3/06* (2013.01); *A47B 2021/066* (2013.01); *A47B 2200/008* (2013.01); *H02J 7/0045* (2013.01); *H02J 2207/20* (2020.01); *H02M 5/42* (2013.01)

(58) Field of Classification Search
CPC ......... A47B 21/06; A47B 21/00; A47B 21/02; A47B 17/02; A47B 3/002; A47B 2021/066; A47B 2200/008
USPC ............ 108/50.01, 50.02, 147; 312/194, 195
See application file for complete search history.

(56) References Cited

U.S. PATENT DOCUMENTS

| | | | |
|---|---|---|---|
| 2,411,620 A | 11/1946 | English | |
| 2,764,462 A | 9/1956 | McDonald | |
| 2,771,334 A * | 11/1956 | Wahlbom | A47B 69/00 312/140.2 |
| 4,286,831 A * | 9/1981 | Beers | A47B 43/00 108/124 |
| 4,437,413 A * | 3/1984 | O'Brian | B25H 1/04 108/129 |
| 4,875,418 A * | 10/1989 | Moeckl | A47B 3/06 108/50.02 |
| D306,664 S | 3/1990 | Pouch | |
| 5,915,602 A * | 6/1999 | Nelson | B67D 1/06 222/608 |
| 5,954,412 A * | 9/1999 | Rutherford | A01K 63/006 312/258 |
| 6,017,228 A * | 1/2000 | Verbeek | A47B 21/06 174/493 |
| 6,039,419 A * | 3/2000 | Brown | A47B 3/08 16/387 |
| 7,273,261 B2 * | 9/2007 | DeMars | A47F 9/00 108/115 |
| 7,490,559 B2 * | 2/2009 | Bentschneider | A47B 9/00 108/50.01 |
| 8,051,783 B1 * | 11/2011 | Hoskinson | A47F 3/001 108/50.02 |

(Continued)

FOREIGN PATENT DOCUMENTS

EP 3292800 3/2018

*Primary Examiner* — Jose V Chen
(74) *Attorney, Agent, or Firm* — Kyle A. Fletcher, Esq.

(57) ABSTRACT

The modular portable bar is a furniture item. The modular portable bar is a collapsible structure such that the modular portable bar is a portable structure. The modular portable bar includes a pedestal, a counter, and a control circuit. The counter and the control circuit attach to the pedestal. The counter forms a horizontally oriented working surface used for the purpose of creating a beverage. The pedestal elevates the counter above a supporting surface. The control circuit provides a source of electrical energy used for the creation of a beverage. The control circuit is an independently powered electric circuit.

18 Claims, 7 Drawing Sheets

(56) References Cited

U.S. PATENT DOCUMENTS

| | | | |
|---|---|---|---|
| 8,113,605 B2* | 2/2012 | Ceballos-Godefroy | ............................ A47B 43/00 312/262 |
| 9,622,570 B1* | 4/2017 | Holdredge | ............ E04B 2/7405 |
| 9,717,350 B2 | 8/2017 | DeMars | |
| 10,327,541 B2 | 6/2019 | Insinna | |
| 10,463,174 B2 | 11/2019 | Hesselmann | |
| 10,610,011 B1* | 4/2020 | Greenhill | ............ A47B 23/043 |
| 2004/0065313 A1* | 4/2004 | Thompson | ............. A47B 77/02 126/37 R |
| 2006/0144935 A1* | 7/2006 | Gross | ....................... F16B 12/20 235/383 |
| 2008/0149006 A1* | 6/2008 | Leng | ........................ A47B 3/08 108/121 |
| 2008/0246376 A1 | 10/2008 | Krieger | |
| 2009/0000522 A1* | 1/2009 | Collins | .................. A47B 3/087 108/12 |
| 2009/0284111 A1* | 11/2009 | Hazzard | ............... A47B 17/006 312/265.6 |
| 2011/0095579 A1* | 4/2011 | Hill | ........................ A47C 4/021 297/217.1 |
| 2012/0181905 A1* | 7/2012 | Ceballos-Godefroy | ............................ A47F 9/00 312/140.3 |
| 2014/0165884 A1* | 6/2014 | O'Gara | .................. A47B 3/002 108/115 |
| 2014/0373357 A1* | 12/2014 | Elliott | ..................... B23P 11/00 29/897 |
| 2017/0063148 A1* | 3/2017 | Wang | ....................... A47B 37/00 |
| 2017/0354244 A1* | 12/2017 | Lee | ....................... A61B 5/6891 |
| 2018/0014097 A1* | 1/2018 | Lin | ........................ A47B 81/06 |
| 2019/0125074 A1* | 5/2019 | Cheng | .................. H02M 3/137 |

\* cited by examiner

MODULAR PORTABLE BAR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of furniture including tables, more specifically, a folding table with separate parts. (A47B3/06)

SUMMARY OF INVENTION

The modular portable bar is a furniture item. The modular portable bar is a collapsible structure such that the modular portable bar is a portable structure. The modular portable bar comprises a pedestal, a counter, and a control circuit. The counter and the control circuit attach to the pedestal. The counter forms a horizontally oriented working surface used for the purpose of creating a beverage. The pedestal elevates the counter above a supporting surface. The control circuit provides a source of electrical energy used for the creation of a beverage. The control circuit is an independently powered electric circuit. By independently powered is meant that the control circuit can operate without an electrical connection to an external power source.

These together with additional objects, features and advantages of the modular portable bar will be readily apparent to those of ordinary skill in the art upon reading the following detailed description of the presently preferred, but nonetheless illustrative, embodiments when taken in conjunction with the accompanying drawings.

In this respect, before explaining the current embodiments of the modular portable bar in detail, it is to be understood that the modular portable bar is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the modular portable bar.

It is therefore important that the claims be regarded as including such equivalent construction insofar as they do not depart from the spirit and scope of the modular portable bar. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 12.

The modular portable bar 100 (hereinafter invention) is a furniture item. The invention 100 is a collapsible structure such that the invention 100 is a portable structure. The invention 100 comprises a pedestal 101, a counter 102, and a control circuit 103. The counter 102 and the control circuit 103 attach to the pedestal 101. The counter 102 forms a horizontally oriented working surface used for the purpose of creating a beverage. The pedestal 101 elevates the counter 102 above a supporting surface. The control circuit 103 provides a source of electrical energy used for the creation of a beverage. The control circuit 103 is an independently powered electric circuit. By independently powered is meant that the control circuit 103 can operate without an electrical connection to an external power source 174.

The pedestal 101 is a mechanical structure. The pedestal 101 is a load bearing structure. The pedestal 101 forms a load path that transfers the load of the counter 102 to a supporting surface. The counter 102 attaches to the superior boundary of the pedestal 101 to form a horizontally oriented workspace. The pedestal 101 is a rotating structure. The pedestal 101 is a collapsible structure. The pedestal 101 rotates for a collapsed position of minimum volume into a deployed position. The pedestal 101 collapses into the collapsed position for transport. The pedestal 101 comprises a plurality of panels 111 and a plurality of hinges 112. The plurality of hinges 112 interconnect the plurality of panels 111 such that any initial panel selected from the plurality of panels 111 rotates relative to a subsequent panel selected from the plurality of panels 111.

The plurality of panels 111 are interconnected such that the plurality of panels 111 forms a rotating structure. The plurality of panels 111 are interconnected such that the plurality of panels 111 forms a collapsible structure. Each of the plurality of panels 111 is a prism-shaped structure. Each of the plurality of panels 111 has a disk structure. Each of the plurality of panels 111 is oriented such that the congruent ends of the disk structure of each of the plurality of panels 111 are parallel to the force of gravity when the invention 100 is normally deployed. The plurality of panels 111 comprises a first panel 141, a second panel 142, and a third panel 143.

The first panel 141 is a rectangular disk-shaped structure. The first panel 141 is a load bearing structure. The first panel 141 forms a portion of the load path that transfers the load of the counter 102 to the supporting surface. The first panel 141 is oriented relative to the force of gravity such that the major dimension of the first panel 141 is parallel to the force of gravity. The first panel 141 is oriented relative to the force of gravity such that the minor dimension of the first panel 141 is perpendicular to the force of gravity. The minor dimension of the first panel 141 is less than the minor dimension of the u-shaped structure 121.

The second panel 142 is a rectangular disk-shaped structure. The second panel 142 is a load bearing structure. The second panel 142 forms a portion of the load path that transfers the load of the counter 102 to the supporting surface. The second panel 142 is oriented relative to the force of gravity such that the major dimension of the second panel 142 is perpendicular to the force of gravity. The second panel 142 is oriented relative to the force of gravity such that the minor dimension of the second panel 142 is parallel to the force of gravity. The minor dimension of the second panel 142 equals the major dimension of the first panel 141. The major dimension of the second panel 142 is less than the major dimension of the u-shaped structure 121.

The third panel 143 is a rectangular disk-shaped structure. The third panel 143 is a load bearing structure. The third panel 143 is identical to the first panel 141. The third panel 143 forms a portion of the load path that transfers the load of the counter 102 to the supporting surface. The third panel 143 is oriented relative to the force of gravity such that the major dimension of the third panel 143 is parallel to the force of gravity. The third panel 143 is oriented relative to the force of gravity such that the minor dimension of the third panel 143 is perpendicular to the force of gravity. The minor dimension of the third panel 143 is less than the minor dimension of the u-shaped structure 121. The minor dimension of the second panel 142 equals the major dimension of the third panel 143.

The terms the major dimension, the minor dimension, and the thickness are defined elsewhere in this disclosure.

Each of the plurality of hinges 112 is a fastening structure. Each of the plurality of hinges 112 is a rotating structure. Each of the plurality of hinges 112 attaches an initial panel selected from the plurality of panels 111 to a subsequent panel selected from the plurality of panels 111 such that the subsequent panel rotates relative to the initial panel. Each of the plurality of hinges 112 attaches the initial panel to the subsequent panel such that the initial panel and the subsequent panel combine to form a lateral disk structure. Each of the plurality of hinges 112 attaches the initial panel to the subsequent panel such that the initial panel and the subsequent panel can be rotated to form an offset lateral disk structure. The plurality of hinges 112 allows the plurality of panels 111 to rotate from a collapsed position to a deployed position. The plurality of hinges 112 comprises a first piano hinge 151 and a second piano hinge 152.

The first piano hinge 151 is a piano hinge selected from the plurality of hinges 112. The first piano hinge 151 is a locking hinge. The first piano hinge 151 attaches the first panel 141 to the second panel 142 such that the first panel 141 rotates relative to the second panel 142. Specifically, the first piano hinge 151 attaches: a) a lateral face of the first panel 141 that is parallel to the major dimension of the first panel 141; to, b) a lateral face of the second panel 142 that is parallel to the minor dimension of the second panel 142.

The second piano hinge 152 is a piano hinge selected from the plurality of hinges 112. The second piano hinge 152 is a locking hinge. The second piano hinge 152 attaches the third panel 143 to the second panel 142 such that the first panel 141 rotates relative to the second panel 142. Specifically, the second piano hinge 152 attaches: a) a lateral face of the third panel 143 that is parallel to the major dimension of the third panel 143; to, b) a lateral face of the second panel 142 that is parallel to the minor dimension of the second panel 142. The third panel 143 attaches to the lateral face of the second panel 142 that is distal from the first panel 141.

The counter 102 is a prism-shaped structure. The counter has a disk structure. The primary shape of the counter 102 is a u-shape. The counter 102 forms the superior structure of the invention 100. The counter 102 forms a horizontally oriented working space used to prepare one or more beverages. The counter 102 removably attaches to the superior boundary of the pedestal 101. The counter 102 comprises a u-shaped structure 121 and a plurality of c-channels 122.

The u-shaped structure 121 is a prism-shaped structure. The u-shaped structure 121 has a disk structure. The shape of the disk of the u-shaped structure 121 has a u shape. The u-shaped structure 121 forms the primary shape of the counter 102. The pedestal 101 elevates the u-shaped structure 121 above the supporting surface. The u-shaped structure 121 forms the horizontally oriented working space formed by the invention 100. The u-shaped structure 121 removably attaches to the pedestal 101. The u-shaped structure 121 further comprises a superior surface 123 and an inferior surface 124.

The superior surface 123 is a congruent end of the disk structure of the u-shaped structure 121. The superior surface 123 forms the horizontally oriented surface used as the working space provided by the invention 100. The superior surface 123 is the congruent end of the u-shaped structure 121 that is distal from the inferior surface 124. The inferior surface 124 is a congruent end of the disk structure of the u-shaped structure 121. The inferior surface 124 forms the horizontally oriented surface of the u-shaped structure 121 that is proximal to the supporting surface. The inferior surface 124 directly sit on the plurality of panels 111 of the pedestal 101.

The plurality of c-channels 122 forms a fastening structure that removably attaches to the plurality of panels 111 of the pedestal 101. The plurality of c-channels 122 attach to the inferior surface 124 of the u-shaped structure 121. Each of the plurality of c-channels 122 is a c-channel. The c-channel is defined elsewhere in this disclosure. Each of the plurality of c-channels 122 forms a track structure that receives a panel selected from the plurality of panels 111.

The inner diameter of each of the plurality of c-channels 122 is greater than the thickness direction of any panel selected from the plurality of panels 111 such that the lateral face of the disk structure of a panel selected from the plurality of panels 111 will insert into the c-channel selected from the plurality of c-channels 122. The inner diameter of each of the plurality of c-channels 122 is identical. The counter 102 attaches to the pedestal 101 by inserting the lateral face of the disk structure of each panel selected from the plurality of panels 111 into a c-channel selected from the plurality of c-channels 122.

The plurality of c-channels 122 comprises a first c-channel 161, a second c-channel 162, and a third c-channel 163. The plurality of c-channels 122 attach the plurality of panels 111 of the pedestal 101 to the inferior surface 124 of the u-shaped structure 121.

The first c-channel 161 is the c-channel selected from the plurality of c-channels 122 that secures the u-shaped structure 121 to the first panel 141. The first panel 141 inserts into the track formed by the first c-channel 161. The second c-channel 162 is the c-channel selected from the plurality of c-channels 122 that secures the u-shaped structure 121 to the second panel 142. The second panel 142 inserts into the track formed by the second c-channel 162. The third c-channel 163 is the c-channel selected from the plurality of c-channels 122 that secures the u-shaped structure 121 to the third panel 143. The third panel 143 inserts into the track formed by the third c-channel 163.

Figure 1:
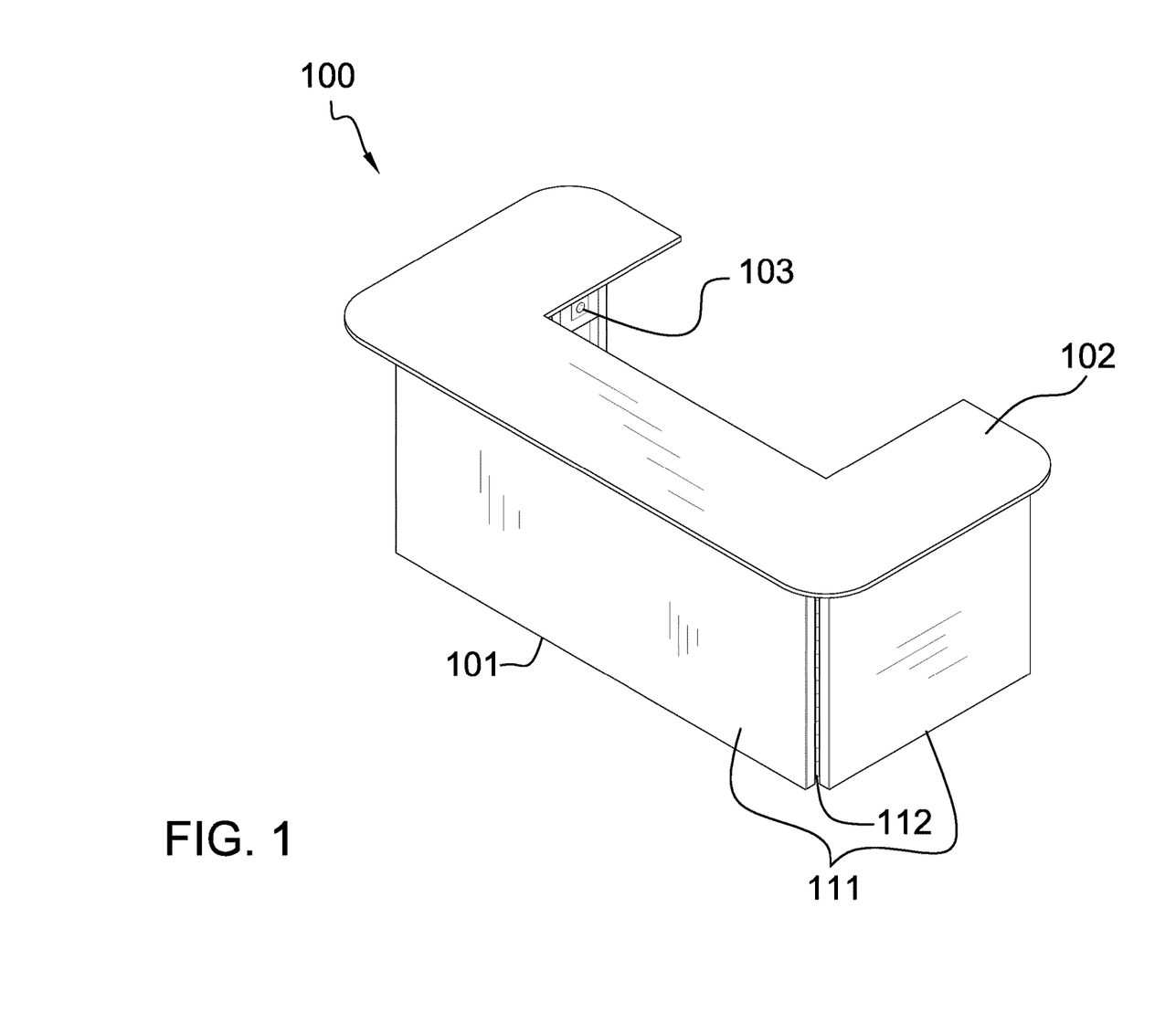
FIG. 1 is a perspective view of an embodiment of the disclosure.
Figure 2:
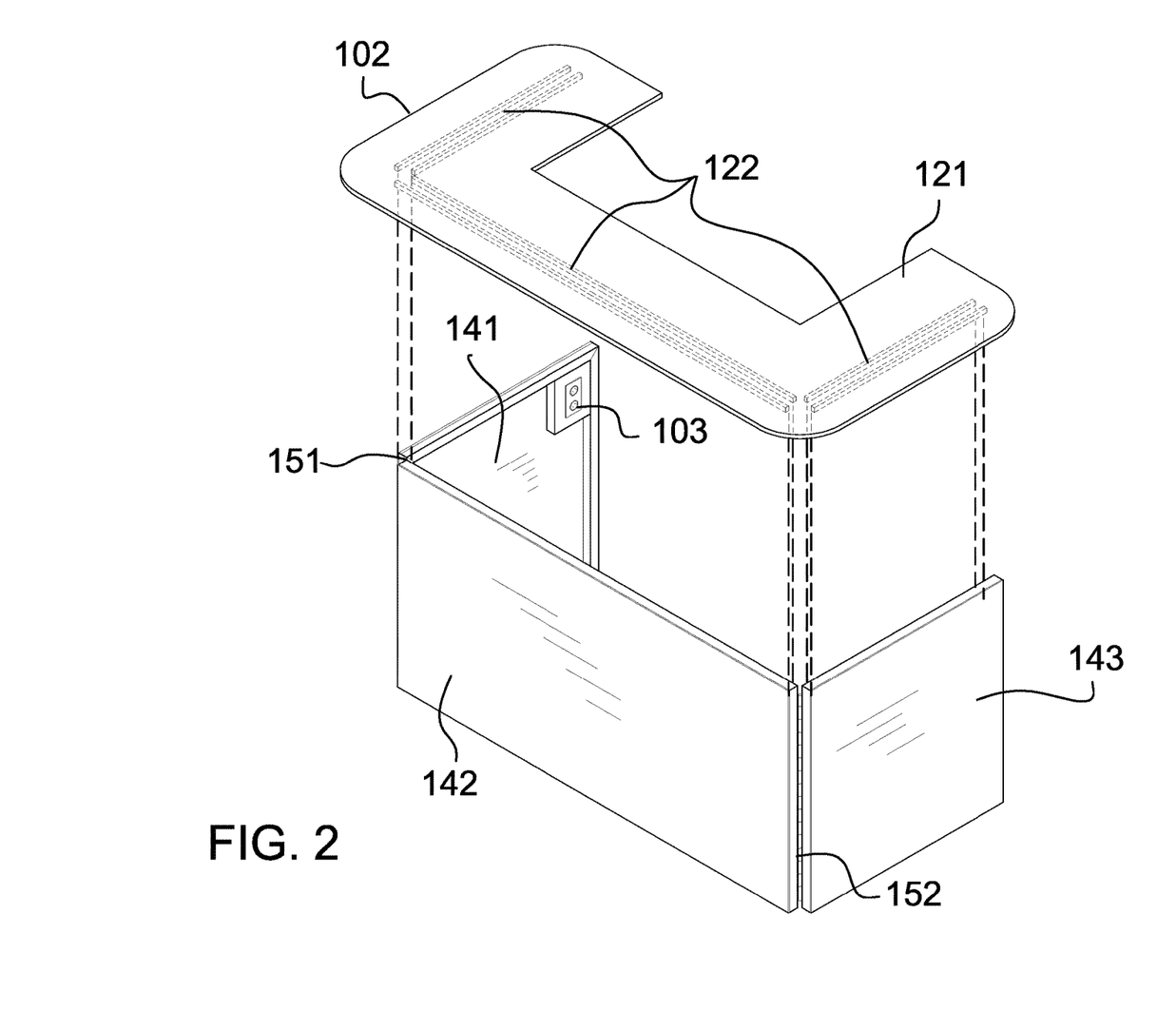
FIG. 2 is an exploded view of an embodiment of the disclosure.
Figure 3:
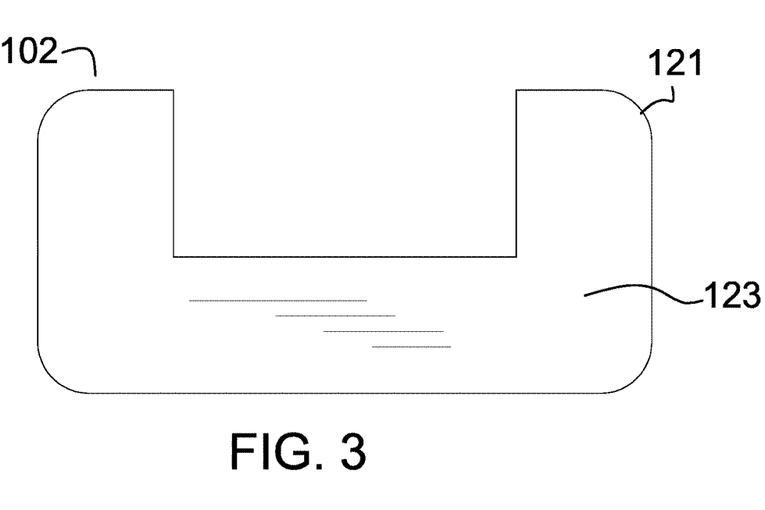
FIG. 3 is a top view of an embodiment of the disclosure.
Figure 4:
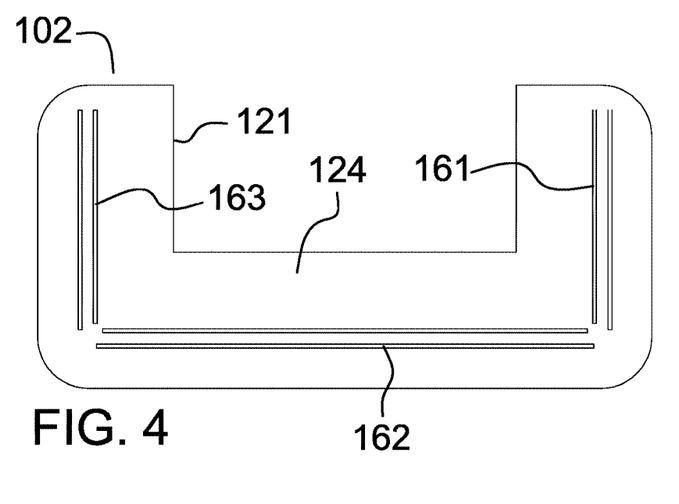
FIG. 4 is a detail view of an embodiment of the disclosure.
Figure 5:
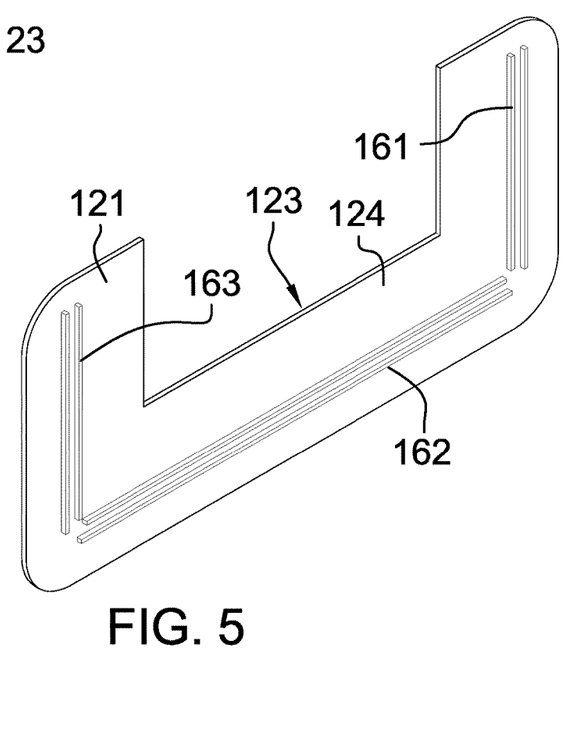
FIG. 5 is a detail view of an embodiment of the disclosure.
Figure 6:
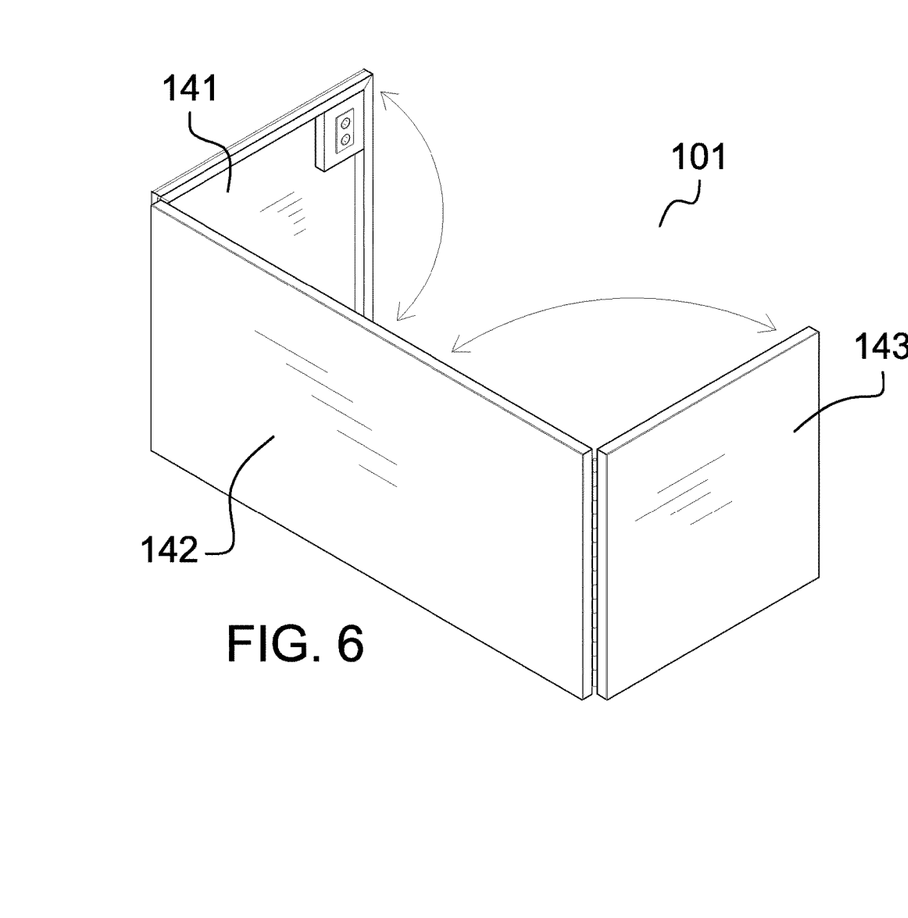
FIG. 6 is a detail view of an embodiment of the disclosure.
Figure 7:
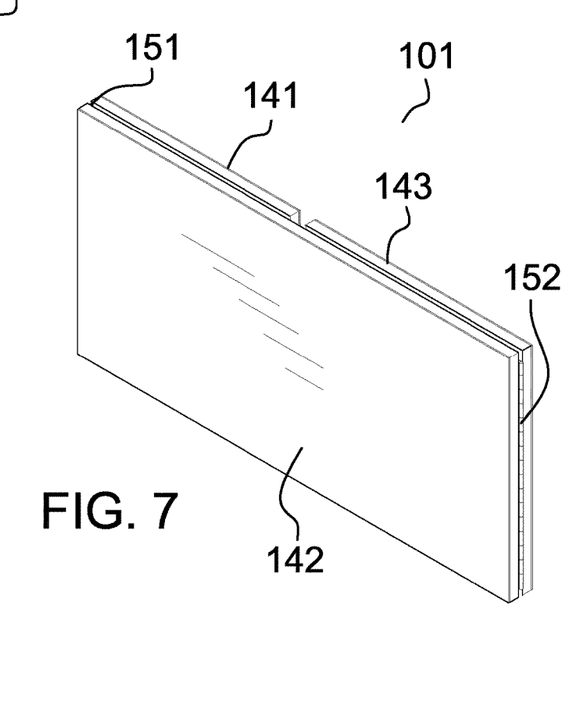
FIG. 7 is a detail view of an embodiment of the disclosure.
Figure 8:
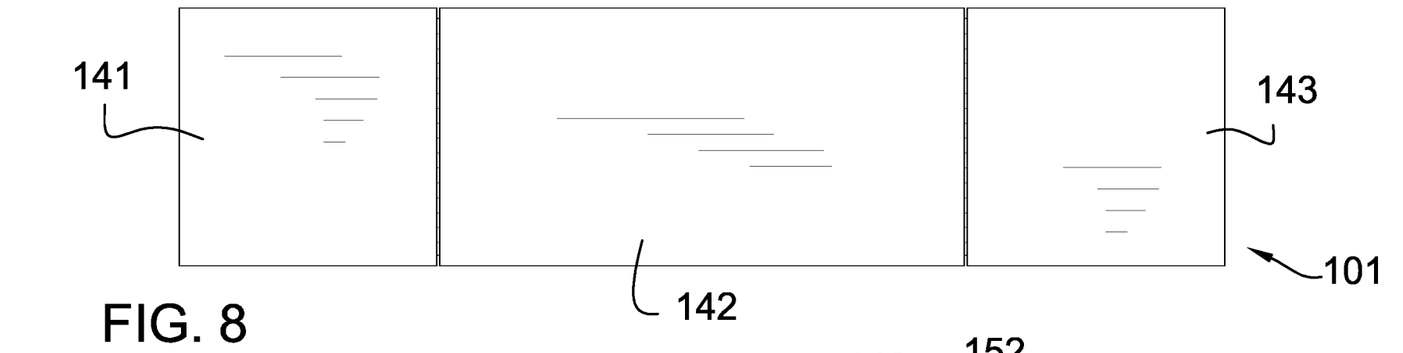
FIG. 8 is a front view of an embodiment of the disclosure.
Figure 9:
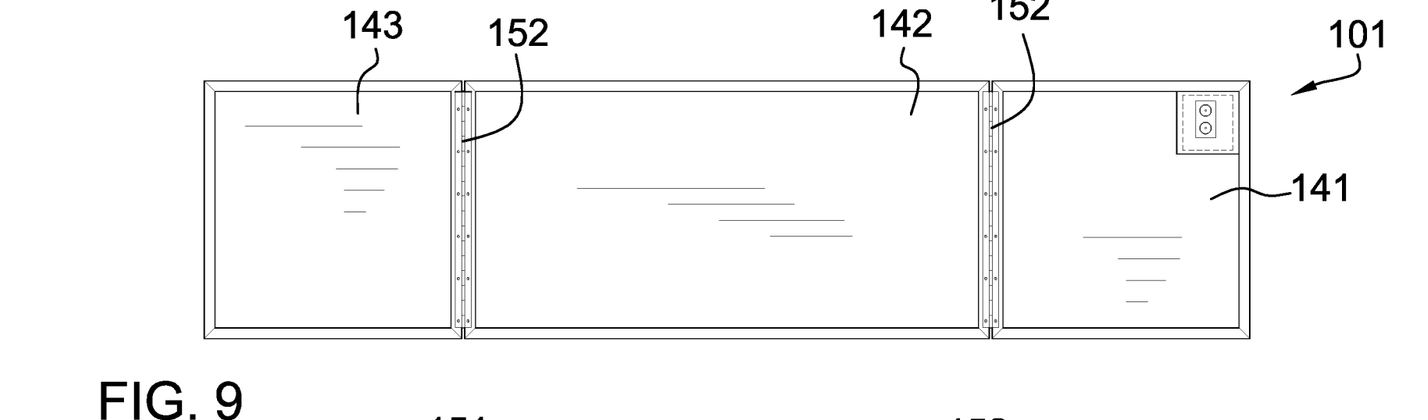
FIG. 9 is a rear view of an embodiment of the disclosure.
Figure 10:
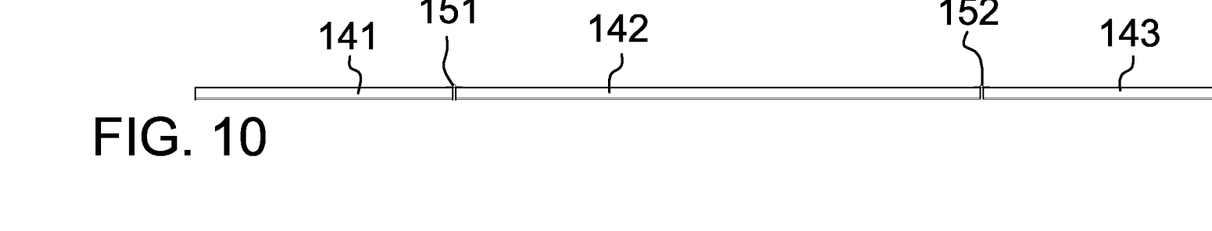
FIG. 10 is a top view of an embodiment of the disclosure.
Figure 11:
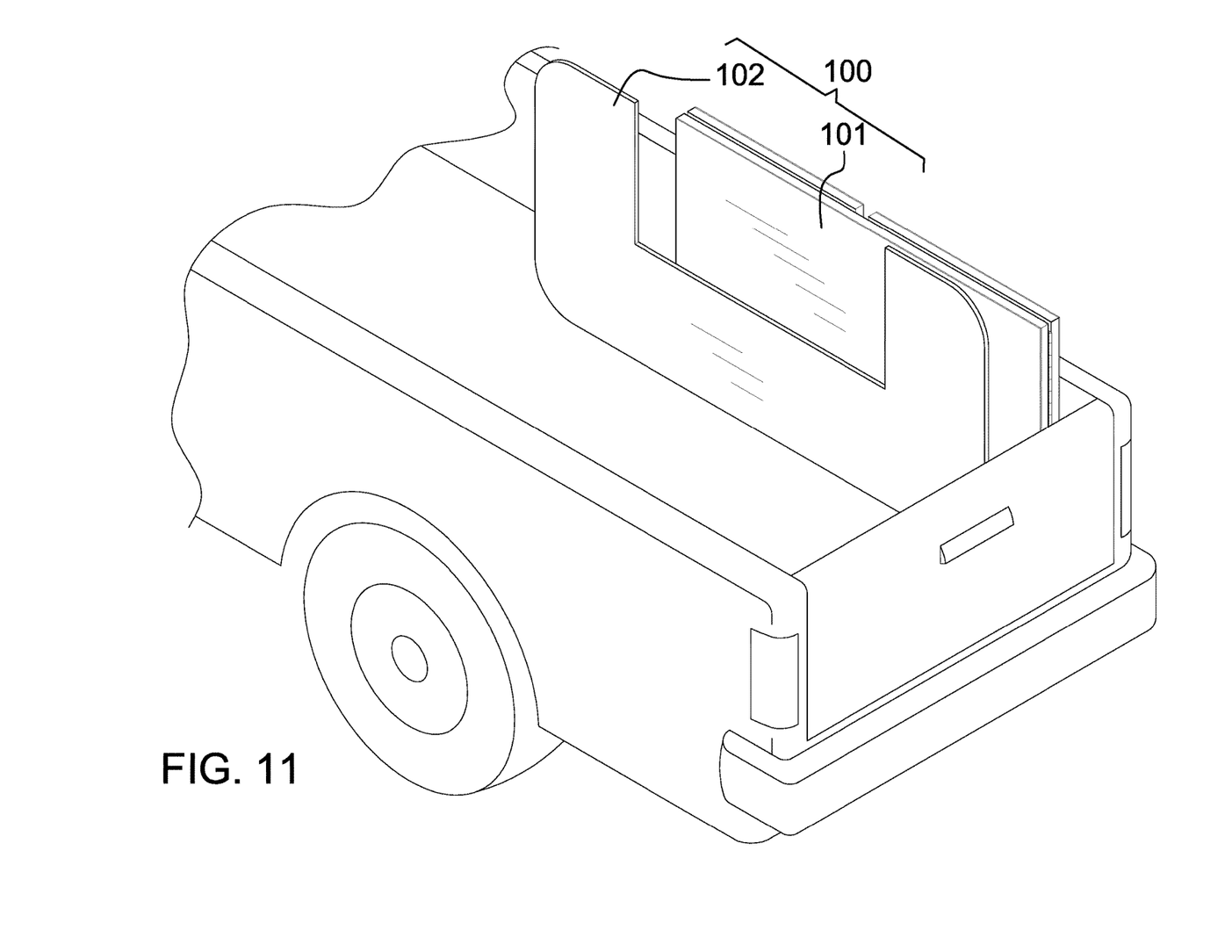
FIG. 11 is an in-use view of an embodiment of the disclosure.
Figure 12:
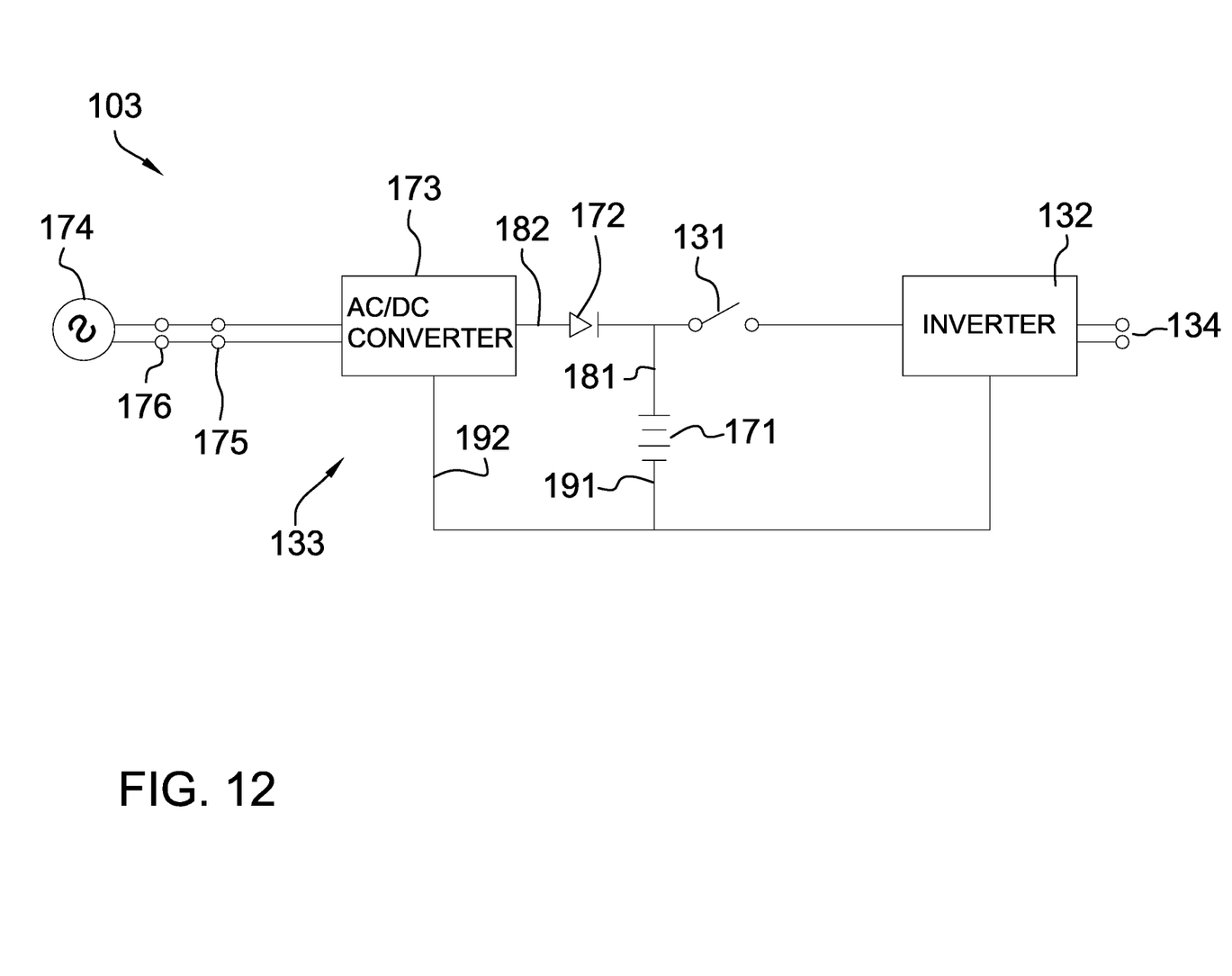
FIG. 12 is a schematic view of an embodiment of the disclosure.

The control circuit 103 is an electric circuit. The control circuit 103 provides electric energy suitable for use in powering the operation of an electrically powered appliance. The control circuit 103 is an electrochemical circuit. The control circuit 103 converts chemical potential energy into electrical energy. The control circuit 103 is an independently powered electric circuit. By independently powered is meant that the control circuit 103 can operate without an electrical connection to an external power source 174. The control circuit 103 comprises a master switch 131, an inverter 132, and a power circuit 133. The master switch 131, the inverter 132, and the power circuit 133 are electrically interconnected.

The master switch 131 is an electric switch. The master switch 131 is wired in series between the power circuit 133 and the inverter 132. The master switch 131 controls the flow of electric energy from the power circuit 133 into the inverter 132.

The inverter 132 is an electric circuit. The inverter 132 converts dc electric energy received from the power circuit 133 through the master switch 131 into ac electrical energy used to power one or more domestic appliances. The inverter 132 is defined elsewhere in this disclosure. The inverter 132 further comprises a NEMA 5-15 Electric Socket 134.

The NEMA 5-15 Electric Socket 134 is an electric port. The NEMA 5-15 Electric Socket 134 forms a detachable electrical connection that allows a domestic appliance to: a) electrically connect to the inverter 132; and, b) draw ac electric energy from the inverter 132. The NEMA 5-15 Electric Socket 134 is configured for use with a plug selected from the group consisting of a NEMA 1-15P electric plug and a NEMA 5-15P electric plug. The NEMA 5-15 Electric Socket 134, the NEMA 1-15P electric plug and the NEMA 5-15P electric plug are defined elsewhere in this disclosure.

The power circuit 133 is an electrical circuit. The power circuit 133 powers the operation of the control circuit 103. The power circuit 133 is an electrochemical device. The power circuit 133 converts chemical potential energy into the electrical energy required to power the control circuit 103. The power circuit 133 comprises a battery 171, a diode 172, an ac/dc converter 173, and an external power source 174. The ac/dc converter 173 further comprises a charging plug 175. The external power source 174 further comprises a charging port 176. The battery 171, the diode 172, the ac/dc converter 173, the external power source 174, the charging plug 175, and the charging port 176 are electrically interconnected. The battery 171 further comprises a first positive terminal 181 and a first negative terminal 191. The ac/dc converter 173 further comprises a second positive terminal 182 and a second negative terminal 192.

The battery 171 is an electrochemical device. The battery 171 converts chemical potential energy into the electrical energy used to power the control circuit 103. The battery 171 is a commercially available rechargeable battery 171. The chemical energy stored within the rechargeable battery 171 is renewed and restored through use of the ac/dc converter 173. The ac/dc converter 173 receives AC electric energy from an external power source 174 and converts the received AC electric energy into DC electric energy. The ac/dc converter 173 is an electrical circuit that reverses the polarity of the rechargeable battery 171 and provides the energy necessary to reverse the chemical processes that the rechargeable battery 171 initially used to generate the electrical energy. This reversal of the chemical process creates a chemical potential energy that will later be used by the rechargeable battery 171 to generate electricity.

The ac/dc converter 173 electrically connects to the external power source 174 using the charging plug 175. The charging plug 175 forms an electrical connection to an external 176 power source 174 using a charging port 176. The charging port forms a detachable electrical connection with the charging plug 175. The charging plug 175 receives electrical energy from the external power source 174 through the charging port 176. The diode 172 is an electrical device that allows current to flow in only one direction. The diode 172 installs between the rechargeable battery 171 and the ac/dc converter 173 such that electricity will not flow from the first positive terminal 181 of the rechargeable battery 171 into the second positive terminal 182 of the ac/dc converter 173. This disclosure assumes that the external power source 174 is an externally provided source of AC electrical energy such as the national electric grid.

The following definitions were used in this disclosure:

AC: As used in this disclosure, AC is an acronym for alternating current.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Appliance: As used in this disclosure, an appliance is an externally powered device or instrument intended for household use.

Battery: As used in this disclosure, a battery is a chemical device consisting of one or more cells, in which chemical energy is converted into electricity and used as a source of power. Batteries are commonly defined with a positive terminal and a negative terminal.

C-Channel: As used in this disclosure, the C-channel is a structure that is formed in a U-shape. The C-channel forms a prism shape with a hollow interior and an open lateral face that forms a shape characteristic of the letter C when viewed from the congruent ends. The open space of the C-channel is often used as a track. A C-channel is a U-shaped structure.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Collapsible: As used in this disclosure, the terms collapsible refers to an object that is configured such that the volume of the object is adjustable. The verb collapse means that the volume of the object is adjusted from a larger volume to a smaller volume. The verbs expand and deploy mean that the volume of the object is adjusted from a smaller volume to a larger volume.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Counter: As used in this disclosure, a counter is a horizontal surface that forms a working space for a project. A counter is further defined with an inferior surface and a superior surface.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Apparatus: As used in this disclosure, an extension apparatus is a mechanical structure that is used to extend or bridge the reach between any two objects.

External Power Source: As used in this disclosure, an external power source is a source of the energy that is externally provided to enable the operation of the present disclosure. Examples of external power sources include, but are not limited to, electrical power sources and compressed air sources.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Inverter: As used in this disclosure, an inverter is an electrical device that converts a DC voltage into an AC voltage. Methods to design and build inverters are well known in the electrical arts.

Lateral Disk Structure: As used in this disclosure, a lateral plate structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a fastening device that secures a rotating mechanical device into a fixed position.

Maintained Switch: A used in this disclosure, a maintained switch is a switch that maintains the position that was set in the most recent switch actuation. A maintained switch works in an opposite manner to a momentary switch.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to the longest edge of a rectangular structure.

Master, Major, Minor, and Thickness Dimensions: As used in this disclosure, the master dimension, the major dimension, the minor dimension, and the thickness each refer to the span of a length associated with a structure selected from the group consisting of a prism structure and a disk structure. The master dimension is the span of the length of the center axis of the selected structure. The thickness is an alternate name given to the master dimension when the selected structure is a disk structure. The major dimension is the span of the length of the major axis of the perimetrical boundary that contains a congruent end of the selected structure. The minor dimension is the span of the length of the minor axis of the perimetrical boundary that contains the congruent end of the selected structure. The terms master dimension, the major dimension, the minor dimension, and the thickness are also used to describe one or more linear axes of direction associated with the selected structure.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid sells electrical power for use by an electrical load. The national electric grid invoices for electrical power based on the total energy consumed by the electrical load. The national electric grid measures the energy consumption of an electrical load with an electrical meter.

Negative Space: As used in this disclosure, negative space is a method of defining an object through the use of open or empty space as the definition of the object itself, or, through the use of open or empty space to describe the boundaries of an object.

NEMA: As used in this disclosure, NEMA is an acronym for National Electric Manufacturers Association. NEMA is a manufacturer's association known for publishing widely accepted technical standards regarding the performance of electrical power distribution equipment.

NEMA 5-15 Electrical Socket: As used in this disclosure, the NEMA 5-15 electrical socket is a port designed to provide electric power drawn from a source of electrical power consistent with the electrical power received through the National Electric Grid. The NEMA 5-15 electrical socket is commonly used to deliver electrical power to electric devices in residential, office, and light industrial settings. The typical NEMA 5-15 electrical socket comprises a plurality of electric ports from which electric power is drawn. The position of each of the plurality of electric ports is placed in a standardized position. The typical NEMA5-15 electrical socket further comprises a plate hole which is a standardized hole located in a standardized position within the NEMA 5-15 electrical socket that is designed to receive a bolt that is used to attach a faceplate to the NEMA 5-15 electrical socket. The NEMA 5-15 electrical socket is also commonly referred to as an electrical outlet.

NEMA 1-15P Electrical Plug: As used in this disclosure, the NEMA 1-15P Electrical Plug is a plug that is designed to be inserted into a NEMA 5-15 Electrical Socket for the purpose of delivering electrical power to electrical devices. The NEMA 1-15P Electrical Plug is a 2 blade plug that is commonly found within residential and office environments within the United States.

NEMA 5-15P Electrical Plug: As used in this disclosure, the NEMA 5-15P Electrical Plug is a plug that is designed to be inserted into a NEMA 5-15 Electrical Socket for the purpose of delivering electrical power to electrical devices. The NEMA 5-15P Electrical Plug is a 3 blade plug that is commonly found within residential and office environments within the United States.

Offset Lateral Disk Structure: As used in this disclosure, an offset lateral disk structure refers to the juxtaposition of a first lateral face of a first disk structure to a second lateral face of a second disk structure in the manner of a lateral disk structure except that one or more of the following conditions need not be true: a) the center axes of the first prism and the second prism are no longer parallel; and, b) the congruent ends of the first prism are no longer parallel to the congruent ends of the second prism.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. For a two-dimensional object, such as the congruent end of a prism, the perimetrical boundary is a hypothetical rectangle with the minimum surface area that fully contains the two-dimensional object.

Piano Hinge: As used in this disclosure, a piano hinge is: 1) a hinge that is longer than 12 inches; and 2) has a pin that runs fully along at least one of the surfaces that the piano hinge is attached to. Piano hinges are also commonly referred to as continuous hinges.

Pivot: As used in this disclosure, a pivot is a rod or shaft around which an object rotates or swings.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rotation: As used in this disclosure, rotation refers to the cyclic movement of an object around a fixed point or fixed axis. The verb of rotation is to rotate.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure often referred to as a daisy chain Socket: As used in this disclosure, a socket is an electrical device that 1) forms an opening or a cavity that acts as a receptacle for an inserted object; and 2) is designed to receive or transfer electricity to or from the object inserted in the socket.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Track: As used in this disclosure, a track is a physical structural relationship between a first object and a second object that serves a purpose selected from the group consisting of: 1) fastening the second object to the first object; 2) controlling the path of motion of the first object relative to the second object in at least one dimension and in a maximum of two dimensions; or, 3) a combination of the first two elements of this group.

U-Shaped Structure: As used in this disclosure, a U-shaped structure refers to a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of the length of the first arm roughly equals the span of the length of the second arm.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Volt: As used in this disclosure, a volt refers to the difference in electrical potential energy between two points in an electric circuit. A volt is measured as joules per coulomb. The term voltage refers to a quantitative measure of the volts between the two points.

With respect to the above description, it is to be realized that the optimum dimensional relationship for the various components of the invention described above and in FIGS. 1 through 12 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A modular portable bar comprising
a pedestal, a counter, and a control circuit;

wherein the counter and the control circuit attach to the pedestal;
wherein the modular portable bar is a furniture item;
wherein the modular portable bar is a collapsible structure such that the modular portable bar is a portable structure;
wherein the counter forms a horizontally oriented working surface;
wherein the pedestal elevates the counter above a supporting surface;
wherein the control circuit provides a source of electrical energy;
wherein the control circuit is an electric circuit;
wherein the control circuit is an independently powered electric circuit;
wherein the pedestal is a load bearing structure, which forms a load path that transfers the load of the counter to a supporting surface;
wherein the counter attaches to the superior boundary of the pedestal to form a horizontally oriented workspace;
wherein the pedestal is a rotating structure that is collapsible;
wherein the pedestal rotates from a collapsed position of minimum volume into a deployed position;
wherein the pedestal collapses into the collapsed position for transport.

2. The modular portable bar according to claim 1
wherein the counter is a prism-shaped structure;
wherein the primary shape of the counter is a u-shape;
wherein the counter forms the superior structure of the modular portable bar;
wherein the counter forms a horizontally oriented working space;
wherein the counter removably attaches to the superior boundary of the pedestal.

3. The modular portable bar according to claim 2
wherein the control circuit is an electrochemical circuit;
wherein the control circuit converts chemical potential energy into electrical energy;
wherein the control circuit provides electric energy suitable for use in powering the operation of an electrically powered appliance;
wherein the control circuit comprises a master switch, an inverter, and a power circuit;
wherein the master switch, the inverter, and the power circuit are electrically interconnected.

4. The modular portable bar according to claim 3
wherein the pedestal comprises a plurality of panels and a plurality of hinges;
wherein the plurality of hinges interconnect the plurality of panels such that any initial panel selected from the plurality of panels rotates relative to a subsequent panel selected from the plurality of panels;
wherein the plurality of panels are interconnected such that the plurality of panels forms a rotating structure;
wherein the plurality of panels are interconnected such that the plurality of panels forms a collapsible structure.

5. The modular portable bar according to claim 4
wherein each of the plurality of panels is a prism-shaped structure;
wherein each of the plurality of panels is oriented such that the congruent ends of each of the plurality of panels are parallel to the force of gravity when the modular portable bar is normally deployed.

6. The modular portable bar according to claim 5
wherein each of the plurality of hinges is a fastening structure;
wherein each of the plurality of hinges is a rotating structure;
wherein each of the plurality of hinges attaches an initial panel selected from the plurality of panels to a subsequent panel selected from the plurality of panels such that the subsequent panel rotates relative to the initial panel;
wherein each of the plurality of hinges attaches the initial panel to the subsequent panel.

7. The modular portable bar according to claim 6
wherein the plurality of panels comprises a first panel, a second panel, and a third panel;
wherein the first panel is a rectangular disk-shaped structure;
wherein the first panel is a load bearing structure;
wherein the first panel forms a portion of the load path that transfers the load of the counter to the supporting surface;
wherein the first panel is oriented relative to the force of gravity such that the major dimension of the first panel is parallel to the force of gravity;
wherein the first panel is oriented relative to the force of gravity such that the minor dimension of the first panel is perpendicular to the force of gravity;
wherein the minor dimension of the first panel is less than the minor dimension of the u-shaped structure;
wherein the second panel is a rectangular disk-shaped structure;
wherein the second panel is a load bearing structure;
wherein the second panel forms a portion of the load path that transfers the load of the counter to the supporting surface;
wherein the second panel is oriented relative to the force of gravity such that the major dimension of the second panel is perpendicular to the force of gravity;
wherein the second panel is oriented relative to the force of gravity such that the minor dimension of the second panel is parallel to the force of gravity;
wherein the minor dimension of the second panel equals the major dimension of the first panel;
wherein the major dimension of the second panel is less than the major dimension of the u-shaped structure;
wherein the third panel is a rectangular disk-shaped structure;
wherein the third panel is a load bearing structure;
wherein the third panel is identical to the first panel;
wherein the third panel forms a portion of the load path that transfers the load of the counter to the supporting surface;
wherein the third panel is oriented relative to the force of gravity such that the major dimension of the third panel is parallel to the force of gravity;
wherein the third panel is oriented relative to the force of gravity such that the minor dimension of the third panel is perpendicular to the force of gravity;
wherein the minor dimension of the third panel is less than the minor dimension of the u-shaped structure;
wherein the minor dimension of the second panel equals the major dimension of the third panel.

8. The modular portable bar according to claim 7
wherein the plurality of hinges comprises a first piano hinge and a second piano hinge;
wherein the first piano hinge attaches the first panel to the second panel such that the first panel rotates relative to the second panel;

wherein the second piano hinge attaches the third panel to the second panel such that the first panel rotates relative to the second panel;
wherein the first piano hinge is a piano hinge;
wherein the second piano hinge is a piano hinge.

9. The modular portable bar according to claim 8
wherein the first piano hinge attaches: a) a lateral face of the first panel that is parallel to the major dimension of the first panel; to, b) a lateral face of the second panel that is parallel to the minor dimension of the second panel;
wherein the second piano hinge attaches: a) a lateral face of the third panel that is parallel to the major dimension of the third panel; to, b) a lateral face of the second panel that is parallel to the minor dimension of the second panel;
wherein the third panel attaches to the lateral face of the second panel that is distal from the first panel.

10. The modular portable bar according to claim 9
wherein the counter comprises a u-shaped structure and a plurality of c-channels;
wherein the u-shaped structure forms the horizontally oriented working space formed by the modular portable bar;
wherein the plurality of c-channels forms a fastening structure that removably attaches to the plurality of panels of the pedestal.

11. The modular portable bar according to claim 10
wherein the u-shaped structure is a prism-shaped structure;
wherein the shape of the disk of the u-shaped structure has a u shape;
wherein the u-shaped structure forms the primary shape of the counter;
wherein the pedestal elevates the u-shaped structure above the supporting surface;
wherein the u-shaped structure removably attaches to the pedestal.

12. The modular portable bar according to claim 11
wherein the u-shaped structure further comprises a superior surface and an inferior surface;
wherein the superior surface is a congruent end of the u-shaped structure;
wherein the superior surface forms the horizontally oriented surface used as the working space provided by the modular portable bar;
wherein the superior surface is the congruent end of the u-shaped structure that is distal from the inferior surface;
wherein the inferior surface is a congruent end of the u-shaped structure;
wherein the inferior surface forms the horizontally oriented surface of the u-shaped structure that is proximal to the supporting surface;
wherein the inferior surface directly sit on the plurality of panels of the pedestal.

13. The modular portable bar according to claim 12
wherein the plurality of c-channels attach to the inferior surface of the u-shaped structure;
wherein each of the plurality of c-channels is a c-channel;
wherein each of the plurality of c-channels forms a track structure that receives a panel selected from the plurality of panels;
wherein the inner diameter of each of the plurality of c-channels is greater than the thickness direction of any panel selected from the plurality of panels such that the lateral face of a panel selected from the plurality of panels will insert into the c-channel selected from the plurality of c-channels;
wherein the inner diameter of each of the plurality of c-channels is identical;
wherein the counter attaches to the pedestal by inserting the lateral face of each panel selected from the plurality of panels into a c-channel selected from the plurality of c-channels.

14. The modular portable bar according to claim 13
wherein the plurality of c-channels comprises a first c-channel, a second c-channel, and a third c-channel;
wherein the plurality of c-channels attach the plurality of panels of the pedestal to the inferior surface of the u-shaped structure;
wherein the first c-channel is the c-channel selected from the plurality of c-channels that secures the u-shaped structure to the first panel;
wherein the first panel inserts into the track formed by the first c-channel;
wherein the second c-channel is the c-channel selected from the plurality of c-channels that secures the u-shaped structure to the second panel;
wherein the second panel inserts into the track formed by the second c-channel;
wherein the third c-channel is the c-channel selected from the plurality of c-channels that secures the u-shaped structure to the third panel;
wherein the third panel inserts into the track formed by the third c-channel.

15. The modular portable bar according to claim 14
wherein the master switch is an electric switch;
wherein the master switch is wired in series between the power circuit and the inverter;
wherein the master switch controls the flow of electric energy from the power circuit into the inverter.

16. The modular portable bar according to claim 15
wherein the inverter is an electric circuit;
wherein the inverter converts dc electric energy received from the power circuit through the master switch into ac electrical energy used to power one or more domestic appliances;
wherein the inverter further comprises a NEMA 5-15 electric socket;
wherein the NEMA 5-15 electric socket is an electric port;
wherein the NEMA 5-15 electric socket forms a detachable electrical connection that allows a domestic appliance to: a) electrically connect to the inverter;
and, b) draw ac electric energy from the inverter;
wherein the NEMA 5-15 electric socket is configured for use with a plug selected from the group consisting of a NEMA5p electric plug and a NEMA 5-15p electric plug.

17. The modular portable bar according to claim 16
wherein the power circuit is an electrical circuit;
wherein the power circuit powers the operation of the control circuit;
wherein the power circuit is an electrochemical device;
wherein the power circuit comprises a battery, a diode, an ac/dc converter, and an external power source;
wherein the ac/dc converter further comprises a charging plug;
wherein the external power source further comprises a charging port;
wherein the battery, the diode, the ac/dc converter, the external power source, the charging plug, and the charging port are electrically interconnected;

wherein the battery further comprises a first positive terminal and a first negative terminal;

wherein the ac/dc converter further comprises a second positive terminal and a second negative terminal.

18. The modular portable bar according to claim 17 wherein the battery is a rechargeable battery;

wherein the ac/dc converter receives ac electric energy from an external power source and converts the received ac electric energy into dc electric energy;

wherein the ac/dc converter is an electrical circuit that reverses the polarity of the rechargeable battery and provides the energy necessary to reverse the chemical processes that the rechargeable battery initially used to generate the electrical energy;

wherein the ac/dc converter electrically connects to the external power source using the charging plug;

wherein the charging plug forms an electrical connection to an external power source using a charging port;

wherein the charging port forms a detachable electrical connection with the charging plug;

wherein the charging plug receives electrical energy from the external power source through the charging port;

wherein the diode is an electrical device that allows current to flow in only one direction;

wherein the diode installs between the rechargeable battery and the ac/dc converter such that electricity will not flow from the first positive terminal of the rechargeable battery into the second positive terminal of the ac/dc converter.

\* \* \* \* \*